United States Patent [19]

Boissy et al.

[11] 3,914,919

[45] Oct. 28, 1975

[54] DISPLAY CONTAINER LOADER

[75] Inventors: Alexandre Ouellette Boissy, St. Theadore De Chertsey; Norman Donald MacLennan, Dorval, both of Canada

[73] Assignee: Imasco Limited, Montreal, Canada

[22] Filed: June 13, 1974

[21] Appl. No.: 479,081

[52] U.S. Cl. .......................... 53/62; 53/159; 53/194; 53/207

[51] Int. Cl.$^2$ ...................... B65B 57/10; B65B 35/44

[58] Field of Search ......... 53/61, 62, 159, 192, 194, 53/207

[56] References Cited

UNITED STATES PATENTS

| | | | |
|---|---|---|---|
| 1,263,515 | 4/1918 | Biehler et al. | 53/159 X |
| 3,225,512 | 12/1965 | Bulger et al. | 53/62 X |

*Primary Examiner*—Travis S. McGehee

[57] ABSTRACT

A display container loader is disclosed. The loader comprises a counting means for discretely counting packets to be loaded into a display container. In addition, collating means are provided, which are responsive to the counting means for collecting a predetermined number of packets into a group. Finally, loading means are provided for loading the group of packets into a display container.

17 Claims, 8 Drawing Figures

DISPLAY CONTAINER LOADER

INTRODUCTION AND GENERAL DISCUSSION

The present invention relates to an apparatus for automatically and discretely counting a plurality of packets filled with a product, arranging the packets into groups and loading each group of packets so counted into a container.

In addition, the apparatus according to the present invention forms the container for the packets from a container blank by utilizing the counted group of packets as part of the forming operation.

It is known to use a stripping technique to count packets filled with a product. Using this technique, the packets to be counted are held tightly together and moved along in a line in one plane. A stripping plate, cut to a particular length, moves in a second plane intersecting the line of packets and pushes the packets out of line. The packets are stripped away at right angles to their original direction of travel. The number of packets pushed out of line or counted is dependent on the dimensions of the stripping plate. The packets to be counted are sometimes filled with a soft material that can be easily compressed. Since the packets must be tightly held together for use in the stripping technique, it is possible for the stripping plate to push or strip away one too many packets from the line. In addition, the number of packets per group and the thickness of each packet, determines the accuracy of the stripping technique. As a result, the stripping technique for counting packets may not be reliable, especially when used in conjunction with an automatic high speed packaging system.

The present invention overcomes this problem by discretely separating each package to be counted by a finite minimum distance. Once the packets are spaced, a light beam is arranged in the path of the packets. The light beam impinges on a photo-cell and the photo-cell sends an electronic pulse to an electronic counter each time a packet breaks the light beam. The counter can be preset to a given number and when that number of packets is counted, a mechanical gate separates the packets that have been counted from those being counted. Once the packets are counted and separated they are tightly grouped together for packaging.

The present invention uses packaging blanks which are precut to such a shape that when they are formed around the counted group of packets, make a container of the desired configuration for displaying the packaged items. The present invention does away with the need to preform the container and then fill the preformed container with the product, and results in an economical advantage since not only does the apparatus form the container but it uses the counted groups of packets as part of the forming operation.

According to the present invention there is provided a display container apparatus which is comprised of three basic portions. The first portion is a packet delivery portion, the second portion is a packet counting portion and the third portion is a loading portion where the counted packets and the display container blank meet and are formed into a display container containing the counted packets.

STATEMENT OF INVENTION

In accordance with the present invention there is provided a display container loader comprising: counting means for discretely counting packets to be loaded into a display container; collating means, responsive to said counting means, for collecting a predetermined number of packets into a group; and loading means for loading said group of packets into said display container.

INTRODUCTION OF DRAWINGS

The present invention will be described hereinbelow in detail with the aid of the accompanying drawings in which.

DETAILED DESCRIPTION

Figure 1:
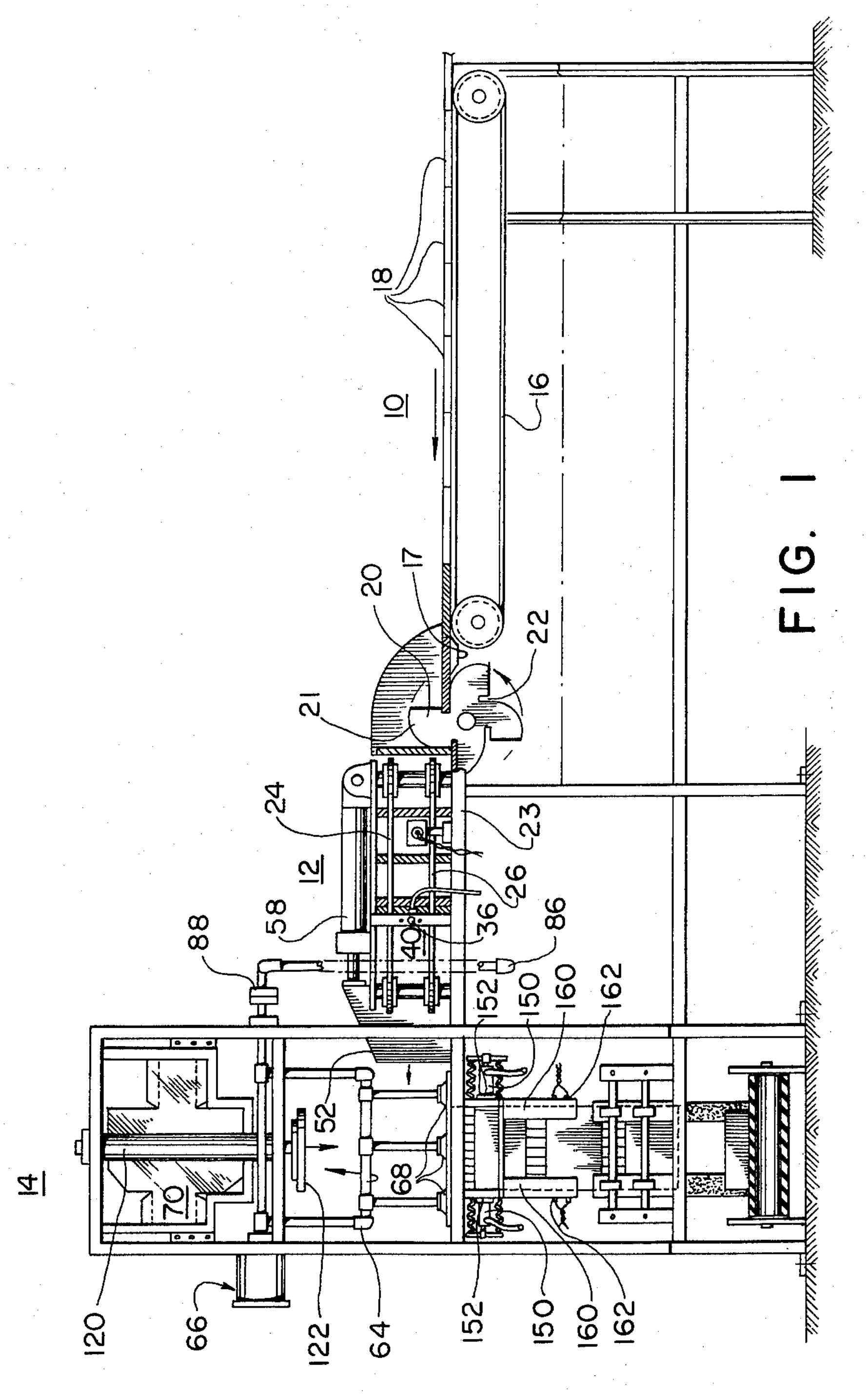
FIG. 1 is a side view of a particular embodiment of the present invention.

Referring to FIG. 1, the apparatus shown is comprised of three basic portions, a packet delivery portion 10, a packet counting portion 12 and a packet loading portion 14. The packets 18, a plurality of which are to be counted and packaged into a display container, are filled with material and are either manually or automatically placed on the conveyor 16. If the packets are placed on a conveyor 16 manually, the conveyor is provided with its own driving power. However, if the packets are placed on the conveyor automatically, the conveyor is driven by the device placing the packets. For example, in the present application, the packets are filled with cigars and the filled packets are wrapped in cellophane (Trade Mark) by a wrapping machine. It is this wrapping machine that drives the conveyor 16.

Figure 2:
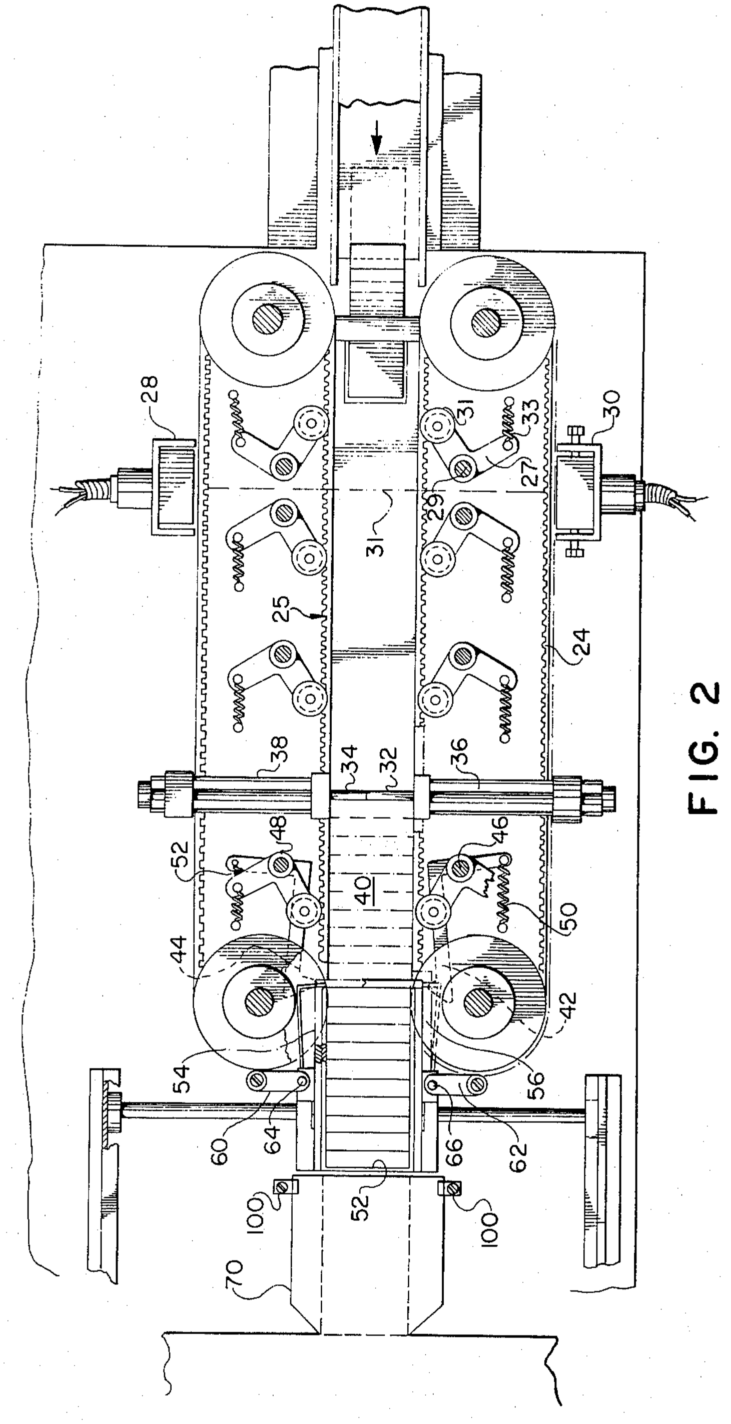
FIG. 2 is a partial top view of the embodiment shown in FIG. 1.
Figure 3:
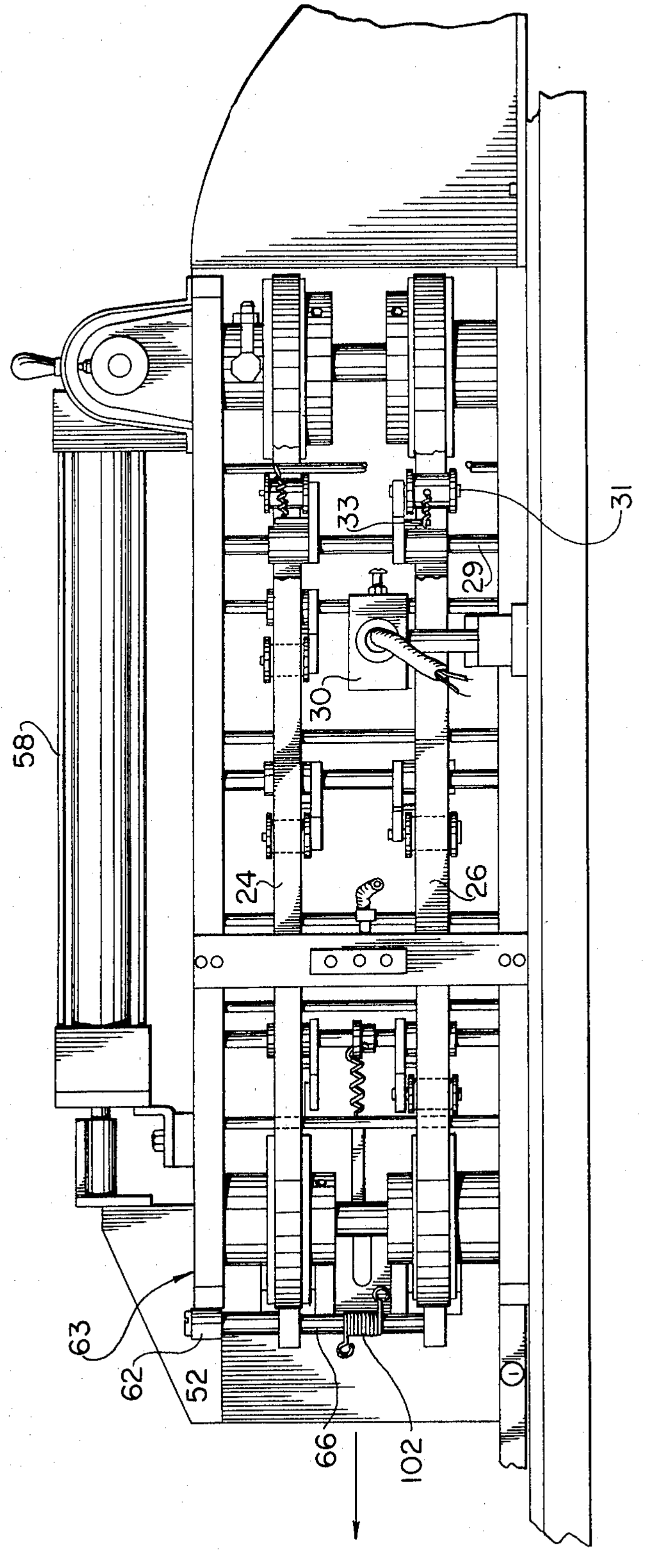
FIG. 3 is a partial side view of that portion of the embodiment shown in FIG. 2.

The packets can be placed end to end on the conveyor or they can be spaced from one another. A dead plate 17 situated between the conveyor 16 and the star-wheel 20 allows those spaced packets to bunch up, end to end. In any event, the packets are placed on the conveyor with their largest face resting against the conveyor belt. The conveyor moves each packet into one of the openings 22 in a star-wheel 20. The star-wheel, which is driven by the same source that drives the conveyor 16, rotates each packet through approximately 90° so that one small end of each packet is facing downward. The star-wheel 20 has curved unloading surfaces, one of which is shown as surface 21 in FIG. 1. These curved surfaces pass through a slot in the table 23 of the machine thereby removing each packet from the opening 22 in the star-wheel. When the packet has been removed from the opening 22, one of the curved surfaces 21 of the star-wheel push the packet in a substantially horizontal plane on its small end toward the counting portion 12. The counting portion of the machine is illustrated in FIGS. 2 and 3. Four collating or timing belts transport the packets through this portion of the machine. Two of the belts 24 and 26 are seen in FIG. 3 and two of the belts 24 and 25 are shown in FIG. 2. The packets are held by their long edges by the four collating belts. The belts are all driven at substantially the same speed by an electric motor and speed reducer (not shown). The belts are lightly sprung against the packets so as to hold the packets substantially vertically and positively spaced from one another. Spring loaded idler assemblies bias the belts against the packets. Each idler assembly consists of a bell crank 27 pivoted on a shaft 29. One end of each bell crank is fitted with a wheel 31 which runs on one of the belts. The wheel 31 is biased against the belt by a spring 33 fixed to the opposite end of the bell crank.

The packets are arranged end to end at the input to the star-wheel and are tilted through 90° by the star-wheel 20 so that they enter the collating or counting portion 12 of the display container loader with a finite minimum spacing. Since each packet is spaced one from the other in the counting portion 12, they may be discretely counted by the light source 28 and photo-cell arrangement 30 shown in FIG. 2. The embodiment shown in FIG. 1 feeds four packets into the counting portion 12 for each rotation of the star-wheel 22. The photo-cell 30 is connected to an electronic counter which is set to produce a signal at a preset count. The preset count corresponds to the number of packets to be loaded into each display container and so the electronic counter is manually preset at any desired number, in the present embodiment that number is 10.

The first packet, after breaking the light beam 31, is moved along by the belts and comes to rest against the normally closed gates 32 and 34 shown in FIG. 2. The spring loading of the collating belts is sufficient to hold the packets for stable transport through the collating portion of the device, but the force is weak enough to allow the packets to slip in the belts without damage when they come up against the gates 32 and 34. The remaining nine packets in the group to be loaded into the display container, close up behind the first packet to form a group of packets with substantially no intervening spaces therebetween.

When the ten packet group has broken the light beam 31 and closed up against one another and the gates 32, 34, the counter activates the pneumatically operated gates 32 and 34. The gates are activated by pneumatic cylinders 36 and 38. When the gates are open, the collating belts drive the ten packets counted into a temporary holding area 40 shown in FIGS. 1 and 2. Once the 10 packets have entered the temporary holding area 40, the pneumatic cylinders 36 and 38 are deactivated and the gates 32 and 34 close. The embodiment shown employs pneumatic driving units to perform various functions throughout, however, it should be understood that these units could be replaced by other sources of drive as for example, electrical drive solenoids. The 10 packets are held against movement in the temporary holding area by mechanical gates 42 and 44, (see FIG. 2). The mechanical gates 42 and 44 pivot on vertical shafts 46 and 48 respectively and are held in the closed position by biasing springs 50 and 52 respectively. A packet transport box 52, shown in FIG. 1, is open at its top and bottom. The box also has a set of pivoting doors 54 and 56 on its right side, as seen from FIG. 2. The box is driven from left to right and right to left in FIG. 1 by the action of the pneumatic cylinder 58. When the box 52 is driven to the right in FIG. 2, the end of lever arms 60 and 62 come into contact with the top housing 63 shown in FIG. 3. As the box is drawn further to the right, the lever arms 60 and 62 rotate about vertical pins 64, 66 and their pivoting doors 54, 56 open. When the doors open they push the mechanical gates 42, 44 in an outward direction and the counting belts drive the 10 packets from the temporary holding zone 40 into the package transport box 52.

Figure 4:
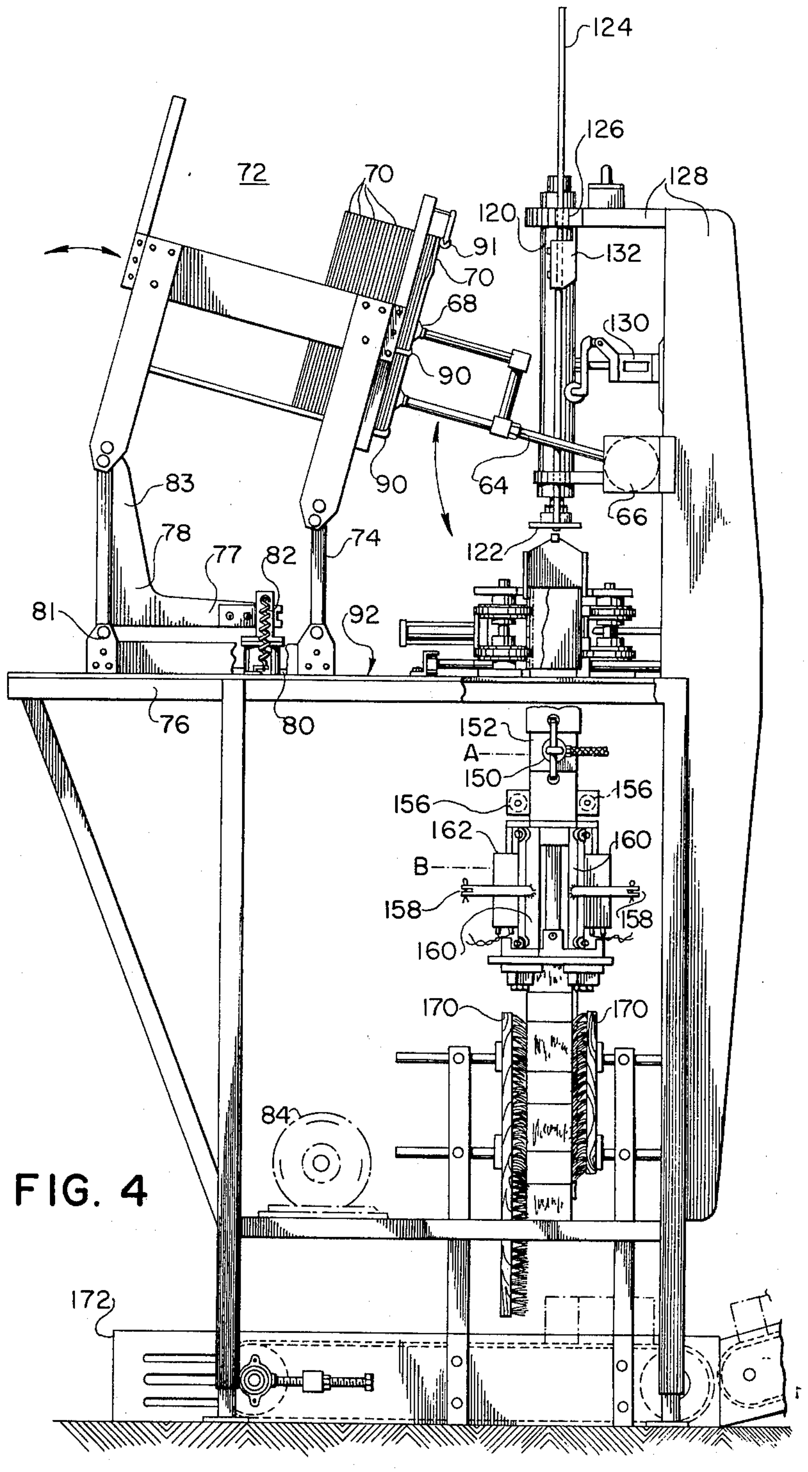
FIG. 4 is an end view of the embodiment shown in FIG. 1.
Figure 5:
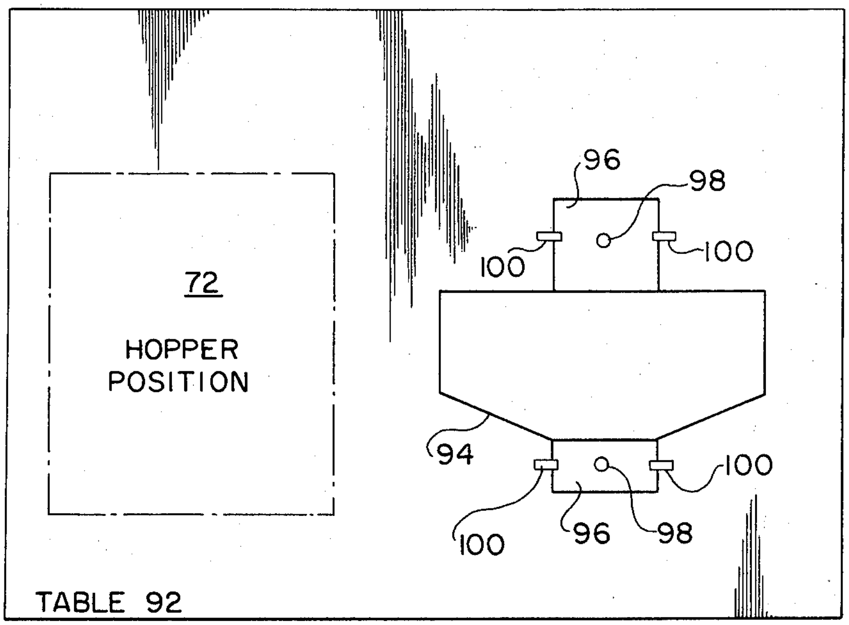
FIG. 5 is a top view in schematic form of the loading portion of the embodiment shown in FIG. 1.

During the time that the box 52 is to the extreme right as seen in FIG. 1, a container blank feed arm 64 is rotated upwards by a rotary pneumatic cylinder 66 so that suction cups 68 are ready to be contacted by one of the display container blanks 70. The display container blanks 70 are loaded in a slanted hopper generally indicated by 72 in FIG. 4. The front part of the hopper 72 is held in position via the double pivoting arm 74 which is connected to the frame of the machine 76. One arm 77 of a bell crank 78 is connected to a pneumatic cylinder 80. A spring 82 is connected to arm 77 and to the frame 76 to bias the arm 77 downward. The bell crank 78 has a second upwardly extending arm 83 which is pivotally connected to the rear end of the hopper 72. The bell crank is also pivotally connected at its fulcrum 81 to the frame 76. In operation, the pneumatic cylinder 80 is activated, forcing arm 77 of the bell crank 78 upwards against the action of the biasing spring 82. The action of the pneumatic cylinder 80 moves the other arm 83 of the bell crank and the hopper 72 to a left most position as shown in FIG. 4. When the hopper is in the left most position, it allows room for the container blank feed arm 64 to swing to its upper rest position so that the suction cups are directly adjacent the first blank in the group of blanks 70 in the hopper. Air pressure is then released in the pneumatic cylinder 80 and the action of spring 82 moves the hopper to its right most position via bell crank 78. This action contacts the first blank with the suction cups 68. An electric motor 84 is situated on the lower frame of the machine and drives a vacuum pump (not shown). The pump is connected to piping 86 (FIG. 2), through a rotary coupling 88, through the container blank feed arm 64 to the suction cups. The suction cups thereby firmly hold the first blank. The pneumatic cylinder is then activated and moves hopper 72 to its left most rest position in a manner previously described. Suction cups, which are firmly gripping the blank, hold the single blank and, as a result, it does not move to the left with the hopper and the rest of the blanks. As a result, the first blank 70 is pulled over the stops 90 and the holding roller 91 situated on the front end of the hopper 72 and is thereby freed from the hopper. The rotary pneumatic cylinder is activated and the container blank feed arm 64 and the first blank 70 is rotated in a counter clockwise direction as seen in FIG. 4, so that the blank is placed on the machine table 92 over the container forming die 94. The table 92 has a cut out opening 94 (see FIG. 5) situated therein and two undercut regions 96 which receive end flap portions of the display container blank. Holes 98 situated in the undercut regions are connected to the vacuum system so that when the container blank feed arm positions the blank over the forming die 94, the end portions of the display container blank are held in the undercut regions 96. To ensure further the proper alignment of the blank over the die, positioning blocks 100 are situated along the perimeter of the undercut regions 96. The vacuum is then released in the suction cups 68 and the rotary pneumatic cylinder 66 swings the container blank feed arm to its upper-most rest position to begin the next cycle.

When the display container blank is positioned over the forming die 94 and the machine table 92, the packet transport box 52 is driven to its leftmost position (see FIG. 1) by the pneumatic cylinder 58 (see FIGS. 1 and 3). The movement of the box 52 away from the right most rest position removes pressure from lever arms 60 and 62 allowing spring 102, (see FIG. 3) to close the pivot doors 54 and 56. This action also closes the mechanical gates 42 and 44 readying the temporary holding station 40 to receive the next group of 10 packets. The temporary holding station 40 is necessary only because the conveyor 16 and the star-wheel 20 are driven by another machine. It will be obvious to anyone of ordinary skill in the art that the present invention relies on the precise timing of many simultaneous mechanical activities. As a result of the temporary holding station 40 and its associated mechanical components and the electronic counter, it is possible to connect the present invention to a device having varying packet feed rates. It should also be understood that there is a maximum feed rate which the present invention can handle.

Figures 6A, 6B:
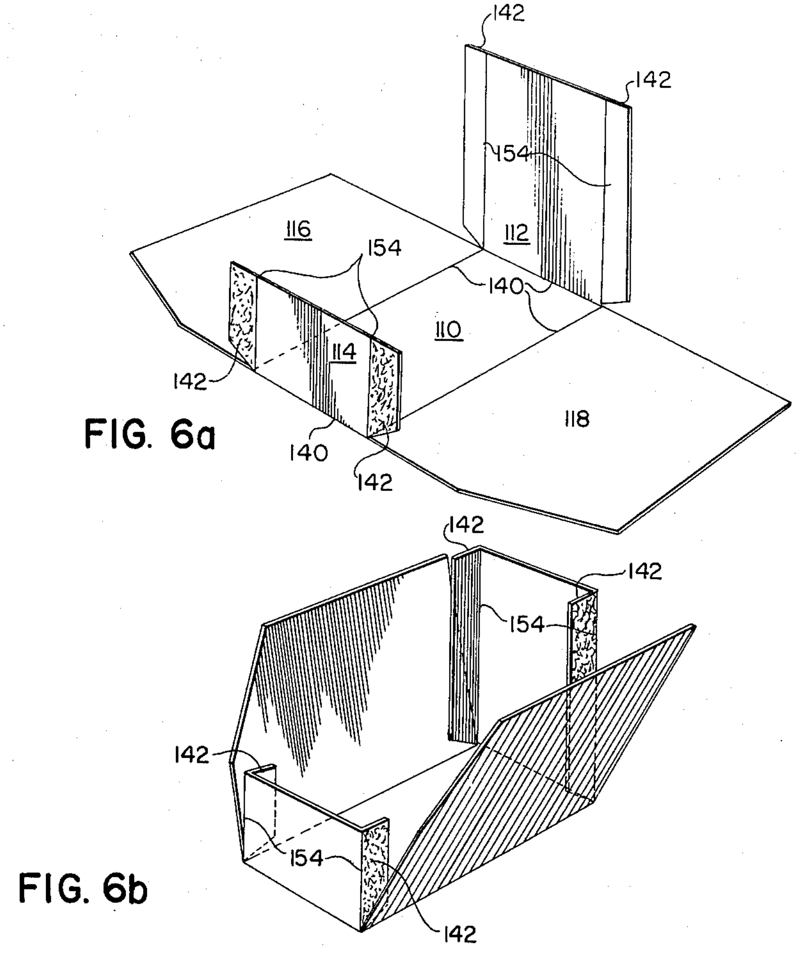
FIGS. 6a, 6b and 6c are perspective views of the display container in its various stages of forming.
Figure 6C:
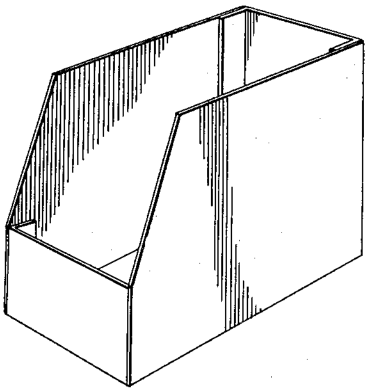

Referring now to FIG. 6*a*, a display container blank is composed of a cardboard sheet which is cut so as to have two side flaps, 116 and 118 attached to a rectangular bottom portion 110 from two opposite edges. Two ends 114 and 112 are attached to the other two opposite edges of the rectangular bottom. The pneumatic cylinder 58 moves the packet transport box 52 to the left most rest position shown in FIG. 1. The packets are positioned directly over that portion of the display container blank which will ultimately be the bottom 110 of the formed display container. A pneumatic ram 120 (see FIGS. 1 and 4) is activated when the box 152 is in the left most rest position shown in FIG. 1. The ram has a plate 122 affixed to its working end. The ram enters the open top of the box 52 and forces the 10 packages and the display container blank through the forming die 94 in the table 92. A gauge rod 124 is fixed to the plate 122 and runs parallel to the longitudinal axis of the pneumatic ram 120. The gauge rod 124 is guided at its upper end by passing through a bushing 126 in frame extension 128. A pneumatic limit switch 130 is also positioned on the frame extension 128. A limit block 132 is adjustably fixed to the gauge rod 124 and when it strikes limit roller 134 on the limit switch 130, the downward motion of the plate is reversed and the ram 120 is returned to its rest position. The plate 122 is dimensioned so that it exactly covers the top of the 10 packages being held in the packet transfer box 152. The display container blanks are pre-creased along the edges indicated by reference numeral 140. When the ram pushes the 10 packets and the display container blank through the forming die 94, the two end flaps 114 and 112 are bent along their respective creases so as to be perpendicular with the bottom portion 110. This configuration is shown in FIG. 6*a*. The two end flaps 112 and 114 both have glue tabs 142 affixed to their sides. The travel of the ram is adjusted by the correct positioning of the limit block 132 on the gauge rod 124 so that it forces the 10 packets and the display container blank to a station indicated by A in FIG. 4. When the packet-container unit is at this position, pneumatic cylinders 150 are activated and U-shaped tab folding plates 152 are pressed against end flaps 112 and 114 and the glue tabs 142, so that they fold around the 10 packets and along creases 154. The glue tabs 142 are then positioned as shown in FIG. 6*b*. The packet-container unit remains at station A until the machine goes through a complete cycle. The next unit of 10 packets and display container blank, when it is forced through the forming die 94 by the ram 120 and plate 122, pushes the first mentioned packet-container unit along to the next station B shown in FIG. 4. As the first mentioned packet-container unit moves from station A to station B, it passes between rollers 156. Rollers 156 bend the side flaps of the display container 116 and 118 upwards so that the container blank now takes on the configuration shown in FIG. 6*c*. When the packet-container unit reaches station B, a pneumatic cylinder (not shown) activates, via levers 158 shown in FIGS. 1 and 4, four corner heating plates 160, to force them against the four corners of the now formed container. This action straightens the container sides 116 and 118 and presses them against the glue tabs 142. Four thermostatically controlled heaters 162, one for each of the four corners (see FIGS. 1 and 4), are then operated and activate hot melt glue which has previously been affixed to the glue tabs 142 of the container blank so that the side flaps 116 and 118 are bonded to the glue tabs 142. The display container takes on the configuration shown in FIG. 6*c*. It must be kept in mind that FIGS. 6*a*, 6*b* and 6*c* have been simplified in that the 10 packets have been omitted. As has been described above, the display container has actually been formed into its final shape from a flat blank with the 10 packets inside. The 10 packets have actually been employed as a form around which the display container has been fashioned.

The pneumatic cylinder which activates the four corner heating plates is electrically controlled so that in the event of a work stoppage, the display container that is situated at station B will not be over heated. The electrical control releases the corner heating plates from the corners of the formed container.

The device according to the present invention cycles again, and another group of 10 packets and a display container are forced through the forming die 94. This action pushes the first mentioned packet-container unit down past station B and away from the heating unit. The hot melt glue must be cooled to obtain a bond. The formed display container is pushed into a set of brushes 170. The brushes hold the side flaps 116 and 118 in place against the glue tabs 142 until the glue has cooled enough to form the required bond. The fully loaded and formed display containers are then forced out of the bottom of the machine by subsequent display containers being forced through the forming die 94 by the plate 122. The filled display containers are removed from the bottom of the machine via conveyor belt 172 shown in FIG. 4.

As mentioned above, the device counts, collects, transports and packages groups of packets in a continuous manner. The apparatus relies on the precise timing of the movements of the various parts for its smooth operation. The sequential activation of the various parts can be accomplished in more than one way. Anyone of ordinary skill in the art would have little difficulty in arranging the precise timing of the movement of the various components. However, for completeness, two possible methods are disclosed. The first method employs the use of a plurality of cams connected to a cam shaft. Each cam activates one or more pneumatic valves and/or electric limit switches to control the various pneumatic components. The cam shaft is rotated by an electric motor and speed reducer and the machine goes through one complete cycle for each complete revolution of the cam shaft. The electronic counter controls an electric clutch which joins the motor/speed reducer to the cam shaft. The designs of the cams and their relative orientation on the cam shaft determine the sequence and timing of the various functions of the pneumatic components making up the machine.

The second way to coordinate the operation of the various components making up the disclosed apparatus is to employ limit valves on each of the components. One or more such valves are associated with each moving component making up the machine. Each valve controls the operation of a component and so by orienting the valves correctly, the motion of one component can control the action of the next. In this manner it is possible to set an entire train of components in motion to follow a complete cycle. In this case, the electronic counter need only initiate the first component to move. After that, each moving component controls, via the above mentioned valves, the operation of other components until an entire cycle is completed. The pneumatic valves mentioned in the above two methods could easily be replaced by electric switches if it was desired to run the device according to the present invention strictly on electricity.

The shape of the display container can be of any box like configuration. The only limitation on the shape of the display container according to the present invention is that it has only five closed sides. More particularly, according to the present invention, the display container must have one open face.

What we claim as our invention is:

1. A display container loader comprising:

a. counting means for discretely counting packets to be loaded into a display container, said counting means including a packet delivery means, said packet delivery mean comprising a conveyor belt for transporting packets, end to end, into a star-wheel, said star-wheel upending each of said packets to thereby discretely separate each of said packets one from another, said packets being fed by said star-wheel into a system of collating belts which carry the discretely separated and upended packets by their edges past a counting station;

b. collating means responsive to said counting means, for collecting a predetermined number of packets into a group; and c. loading means for loading said group of packets into said display container.

2. The display container loader according to claim 1, wherein said counting means includes a light source and a photo-cell located at said counting station, said light source producing a light beam which is broken by packets passing through said station, said photo-cell thereby producing a count pulse upon the passage of each packet.

3. A display container loader according to claim 2, wherein said counting means includes an electronic counter connected to said photo-cell, said counter producing an output control signal upon reaching a count which corresponds to said predetermined number of packets, said counter resetting to zero count upon reaching a count which corresponds to said predetermined number of packets and upon producing said output control signal.

4. A display container loader according to claim 3, wherein said collating belt system includes a first and a second collating belt running symmetrically in a direction about an axis in a first horizontal plane and spaced apart by approximately the width of a packet, and a third and fourth collating belt running symmetrically in said direction about said axis in a second horizontal plane, said third and fourth belts being spaced by approximately the width of a packet, said first and second planes being spaced apart by less than the height of a packet, said first and second collating belts being urged towards one another by spring biasing means to thereby hold packets for movement therebetween, said third and fourth collating belts being urged towards one another by spring biasing means to thereby hold packets for movement therebetween, said first and second and said third and fourth belts all moving at substantially the same speed.

5. A display container loader according to claim 4, wherein first and second pneumatically operated gates are provided between said first and second and said third and fourth belts to stop packets from moving with said belts, thereby allowing said packets to accumulate into said groups, said first and second gates operable to open and to thereby allow said group of packets to move to a holding area via said belts, the operation of said gates being controlled by said counter.

6. A display container loader according to claim 5, wherein said holding area is defined at its side by said belts, at one end by said first and second pneumatic gates and at its opposite end by first and second mechanical gates.

7. A display container loader according to claim 6, further including a packet group transport box, said box being movable between a first and a second position, said first position being directly adjacent said first and second mechanical gates, said box being open at its top and bottom, said box having a side closed by mechanical doors, lever means provided on said doors for opening said doors when said box is in said first position, said doors being oriented with respect to said first and second mechanical gates so that when said box is in said first position, said first and second mechanical gates are opened, thereby allowing said belts to move said group of packets into said box, said first and second mechanical gates and said doors closing when said box moves away from said first position.

8. A display container loader according to claim 7, wherein said loading means includes a hopper means for holding display container blanks, said hopper being movable from a first rest position to a second rest position, said hopper having a display container blank delivery end.

9. A display container loader according to claim 8, wherein said loading means includes a rotary blank delivery means including a display container blank suction holding means, wherein, when said box is in said first position and said hopper is in said first rest position, said delivery means rotates to a first position so that said holding means is adjacent said delivery end, and wherein said hopper then moves to said second rest position thereby contacting a display container blank with said holding means, wherein, said hopper then returns to said first rest postion thereby leaving said blank affixed to said holding means and removed from said hopper, said delivery means then rotating to a second position.

10. A display container loader according to claim 9, wherein said loading means further includes a display container forming die located in a table of said loader, mounted in a horizontal plane, the second position of said delivery means and the second position of said box being directly over said forming die so that said delivery means places said blank over said forming die in said second position and then returns to said first position, said box then moving to said second position thereby placing said group of packets over said blank and said forming die.

11. A display container loader according to claim 10, wherein said display container blank is comprised of a bottom portion having a first pair of opposite edges and a second pair of opposite edges; a front and a back portion connected to said first pair of opposite edges, said front and back portions each having side edges to which glue tabs are connected, said blank also having side portions connected to said second pair of opposite edges.

12. A display container loader according to claim 10, wherein said loader means further includes a ram which moves downwardly through the open top of said box to contact said group of packets, said ram further moving in a downward direction so as to force said blank and said group of packets through said forming die, thereby folding the back and front portions of said blank at approximately 90° to said bottom portion around said group of packets.

13. A display container loader according to claim 12, wherein said loading means further comprises four L-shaped plates located adjacent to the four corners of said group of packets, said four L-shaped plates being moved toward said corners thereby folding said glue tabs against said group of packets at approximately 90° with respect to said front and back portions.

14. A display container loader according to claim 13, wherein said group of packets and said container blank are pushed through a pair of rollers by said ram and a subsequent container-packet group thereby folding said side portions against said group of packets and against said glue tabs.

15. A display container loader according to claim 14, wherein said group of packets and said container blank are moved, by said ram and subsequent container-packet groups into a heating means located at said four corners of said group of packets, said heating means activating hot melt glue on said glue tabs to thereby bond said glue tabs to said side portions to form said display container filled with said group of packets.

16. A display container loader according to claim 15, wherein said loading means further comprises a cooling means which holds said display container and said group of packets in their formed configuration until said hot melt glue cools.

17. A display container loader according to claim 15, wherein said heating means are electrically controlled to prevent over heating of said display container and said group of packets.

* * * * *